United States Patent

Krasutsky et al.

[11] Patent Number: 5,200,606
[45] Date of Patent: Apr. 6, 1993

[54] LASER RADAR SCANNING SYSTEM

[75] Inventors: Nicholas J. Krasutsky, Farmer Branch; Lewis G. Minor, Arlington; Edward M. Flowers, Grand Prairie, all of Tex.

[73] Assignee: LTV Missiles and Electronics Group, Dallas, Tex.

[21] Appl. No.: 724,794

[22] Filed: Jul. 2, 1991

[51] Int. Cl.⁵ .......................... H01J 3/14; G01C 3/08
[52] U.S. Cl. .................................. 250/216; 250/234; 356/5
[58] Field of Search .................. 250/216, 203.2, 203.3, 250/234, 235, 236; 356/4, 4.5, 5

[56] References Cited

U.S. PATENT DOCUMENTS

| | | | |
|---|---|---|---|
| 3,968,362 | 7/1976 | Mocker | 250/216 |
| 4,019,026 | 4/1977 | Nakanishi et al. | 235/61.11 E |
| 4,042,822 | 8/1977 | Brandewie et al. | 250/216 |
| 4,102,572 | 7/1978 | O'Meara | 356/5 |
| 4,148,584 | 4/1979 | Roelants | 356/5 |
| 4,197,006 | 4/1980 | Maillet | 356/5 |
| 4,487,477 | 12/1984 | Helms et al. | 350/172 |
| 4,559,445 | 12/1985 | Hedin et al. | 356/5 |
| 4,647,761 | 3/1987 | Cojan et al. | 250/203 R |
| 4,824,251 | 4/1989 | Slotwinski et al. | 356/349 |
| 4,830,486 | 5/1989 | Goodwin | 356/5 |
| 4,836,672 | 6/1989 | Naiman et al. | 356/289 |
| 4,902,125 | 2/1990 | Keene et al. | 356/4 |

OTHER PUBLICATIONS

LTV Missles & Electronics Group, "Low-Cost Antiarmor Subminition Program" proposal, Jul. 2, 1990.

Primary Examiner—David C. Nelms
Assistant Examiner—John R. Lee
Attorney, Agent, or Firm—Arnold, White & Durkee

[57] ABSTRACT

An apertured mirror permits an outgoing, transmitted laser beam to pass and reflects a return, reflected beam onto a detector array.

14 Claims, 5 Drawing Sheets

LASER RADAR SCANNING SYSTEM

FIELD OF THE INVENTION

The present invention relates generally to a laser guidance system and more particularly to an optical system that splits a laser beam in a laser guidance system.

BACKGROUND OF THE INVENTION

The present invention relates to a laser radar ("LADAR") seeker and guidance system adapted to scan a target area with laser energy, detect the reflected laser energy, and compute range and intensity values, permitting the processing of guidance and control signals for the missile as it approaches the target.

Known laser radar systems have used an apertured mirror in various applications. For example, in U.S. Pat. No. 4,042,822, an expanded beam strikes an apertured mirror and a portion of the light beam passes through the aperture to strike a photodetector. However, such a system mixes return energy with laser beam energy passed through the aperture to provide heterodyne detection of the received target signals. Thus, there remains a need for a laser radar system that includes a turning mirror with an off-center aperture to reflect return light onto a photodetector. This aperture could consist of a mirror with a hole in it or conversely a small mirror on a clear plate. Such a system should advantageously eliminate the need for certain mirrors and lenses, thus simplifying construction and therefore lowering costs. This use maximizes the effective throughput of the LADAR even when central obscuration is present and/or unpolarized beams are used. The aperture is off-center since a secondary mirror located forwardly of a primary mirror is centrally located. The losses on the output beams are minimal and, on the return beams, are limited to the ratio of the output beam area to the return beam area.

BRIEF DESCRIPTION OF THE INVENTION

In a preferred embodiment, the present invention is used as a missile guidance system to identify and home in on a military target. The system is capable of generating three dimensional images of target areas by ranging on points in the imaged scene. Processing electronics are employed for actuating a LADAR transmitter and for processing the laser signals reflected from the target area. The processing system determines where a target is located, identifies the target, and provides guidance signal information such as line-of-sight rate, range, range rate, and a relative position vector (delta x,y, and z). Range and intensity information is generated for a two-dimensional array of points scanned by the LADAR seeker. Range data is obtained by measuring the time delay between transmitted and received laser light pulses emitted by the seeker. The pulses are provided by a Q-switched, solid-state laser, such as Nd:YLF, Nd:YAG, or Nd:YVO$_4$ laser for example, pumped by an external, remotely located diode laser, for example GaAlAs diode laser.

Laser light from the solid-state laser is directed through an apertured mirror onto a scanning mirror. Light reflected from a target strikes the scanning mirror and is reflected onto the apertured mirror. Since the return beam is substantially expanded in cross-sectional area, the aperture mirror reflects a substantial portion of the return light onto a bank of photo-detectors.

BRIEF DESCRIPTION OF THE DRAWING FIGURES

DETAILED DESCRIPTION OF A PREFERRED EMBODIMENT

Figure 1:
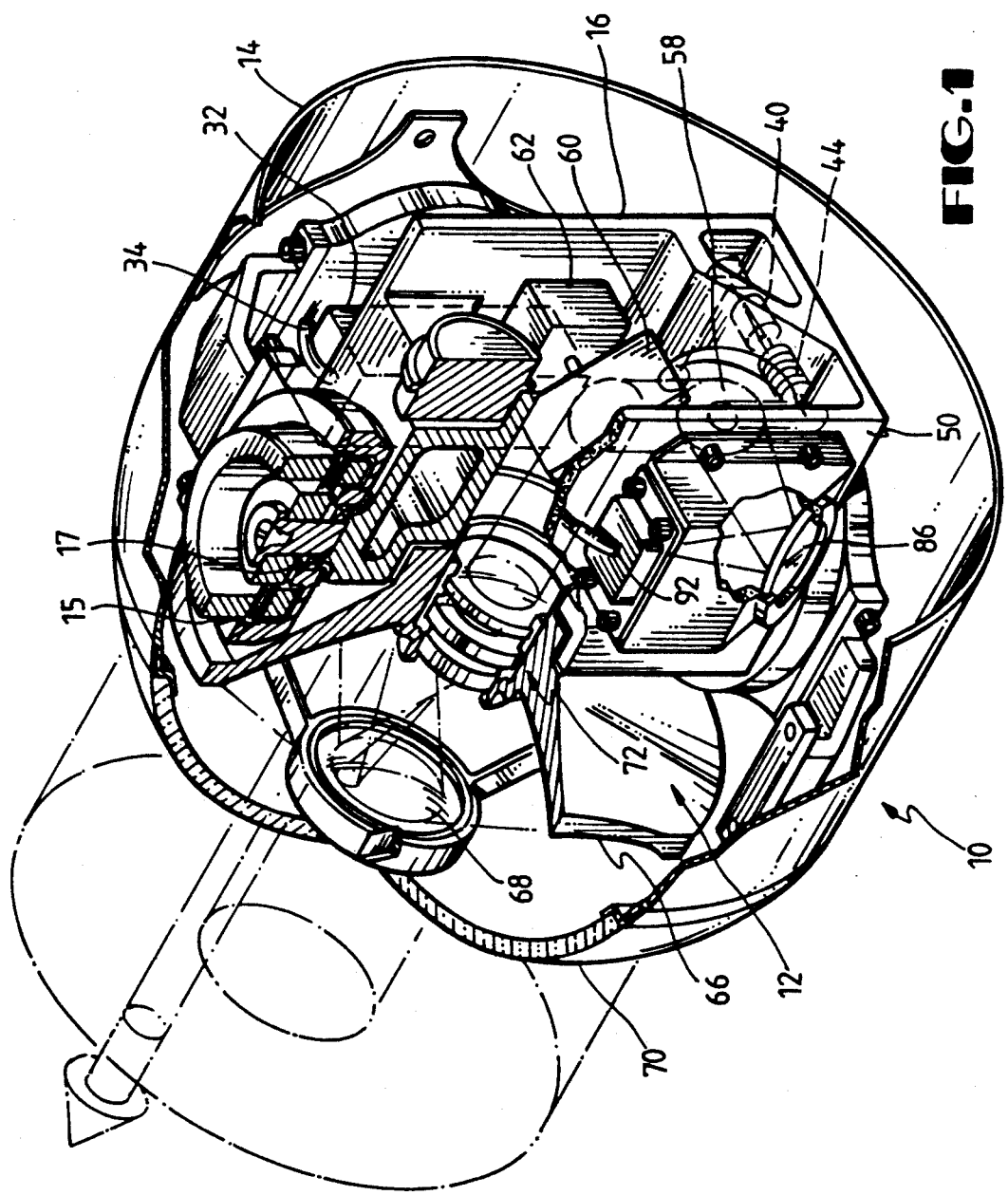
FIG. 1 is a perspective view, partially broken away and partially in section, of the sensor head and LADAR transceiver optics.

FIG. 1 depicts a LADAR seeker head 10 that may employ the present invention. The LADAR seeker head 10 includes an optical system 12 which is gimbal-mounted for pivotal movement within an outer housing 14. The outer housing 14 is non-movably mounted within the forward end portion of a missile or other vehicle, not shown. The seeker head further includes a gimballed frame 16 on which the movable members within the seeker head are mounted.

Figure 2:
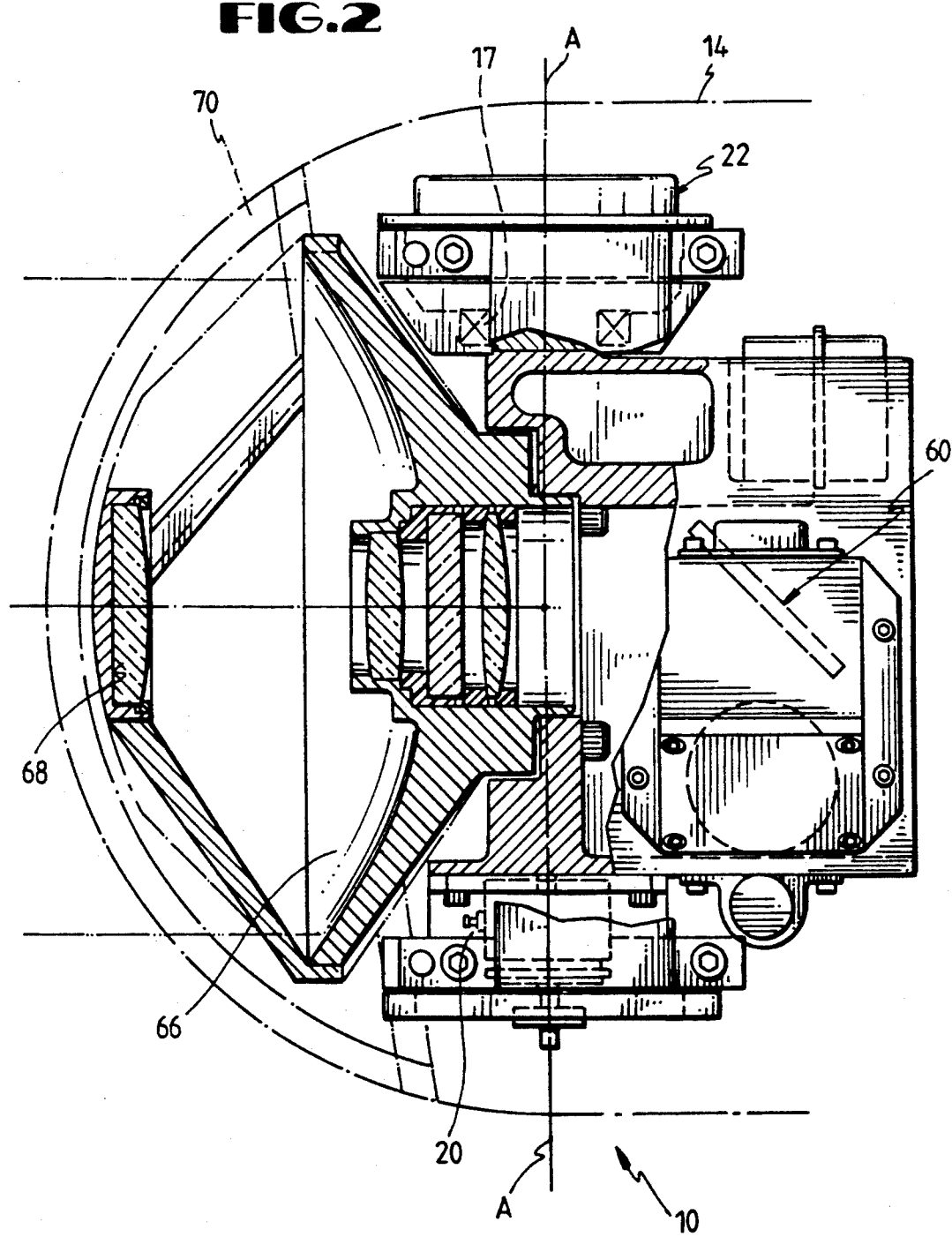
FIG. 2 is an elevation, sectional view of the apparatus of FIG. 1.

FIG. 2 depicts an elevation view of the seeker head 10. The optical system 12 is pivotally supported by upper and lower bearing assemblies 18, 20, respectively, for permitting yaw movement of the optical system within the housing 14. A servo-controlled azimuth drive motor 22 is connected to drive the optical system about an axis A (±22.5 degrees).

Figure 3:
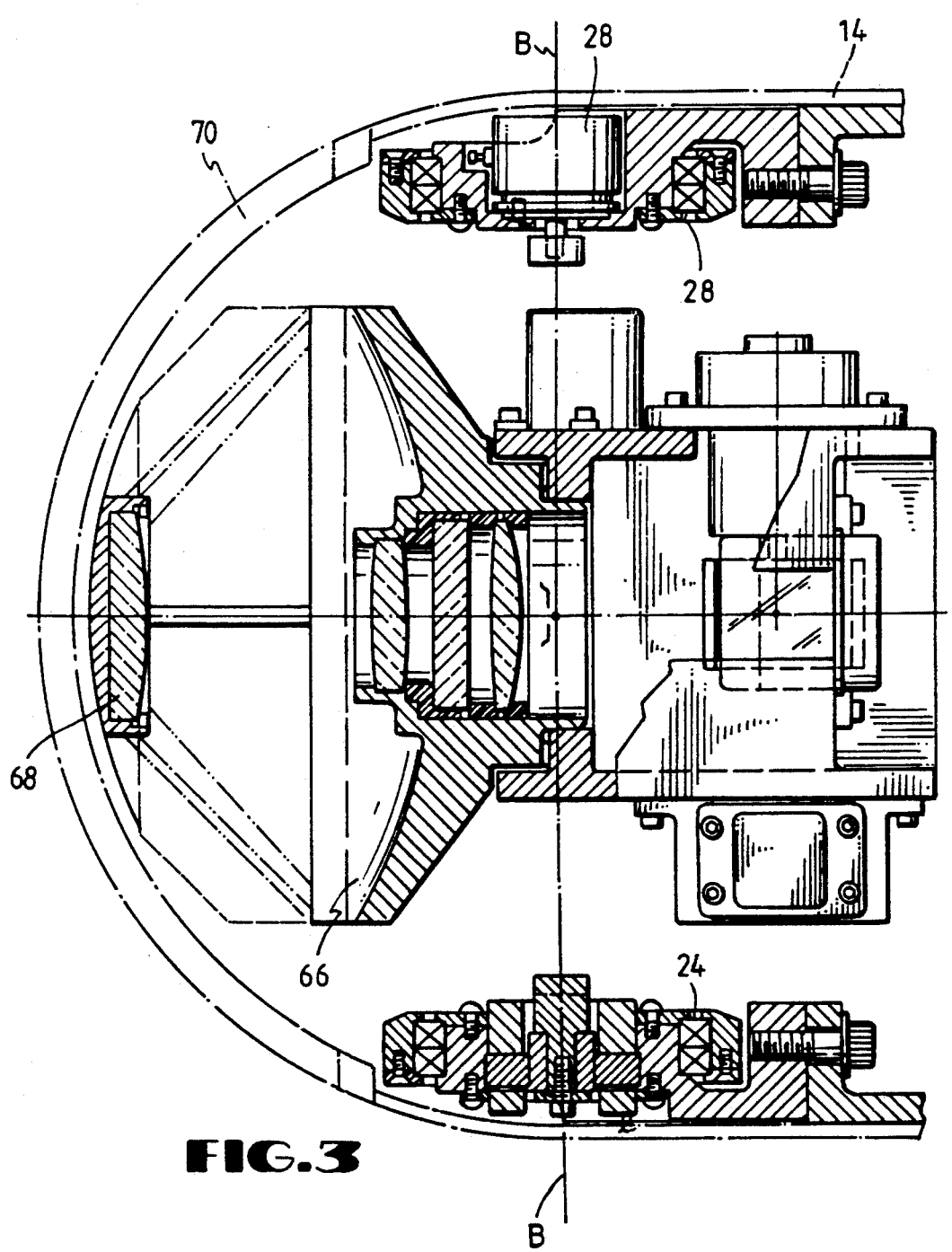
FIG. 3 is a sectional view of the apparatus of FIGS. 1 and 2 taken as on line III—III of FIG. 2.

FIG. 3 depicts a further sectional view of the seeker head 10, taken along the section line III—III of FIG. 2. The outer housing 14 contains left and right bearing assemblies 24, 26 which are similarly mounted on the housing 14 for pivotally supporting the optical system, permitting pitch movement of the optical system 12 about an axis B. The optical system 12 is pivoted about normally horizontal axis B by a servo-controlled scanning motor 28, which, in the preferred embodiment, is operable to scan the system through an arc of ±thirty degrees from a central transmission axis.

Figure 4:
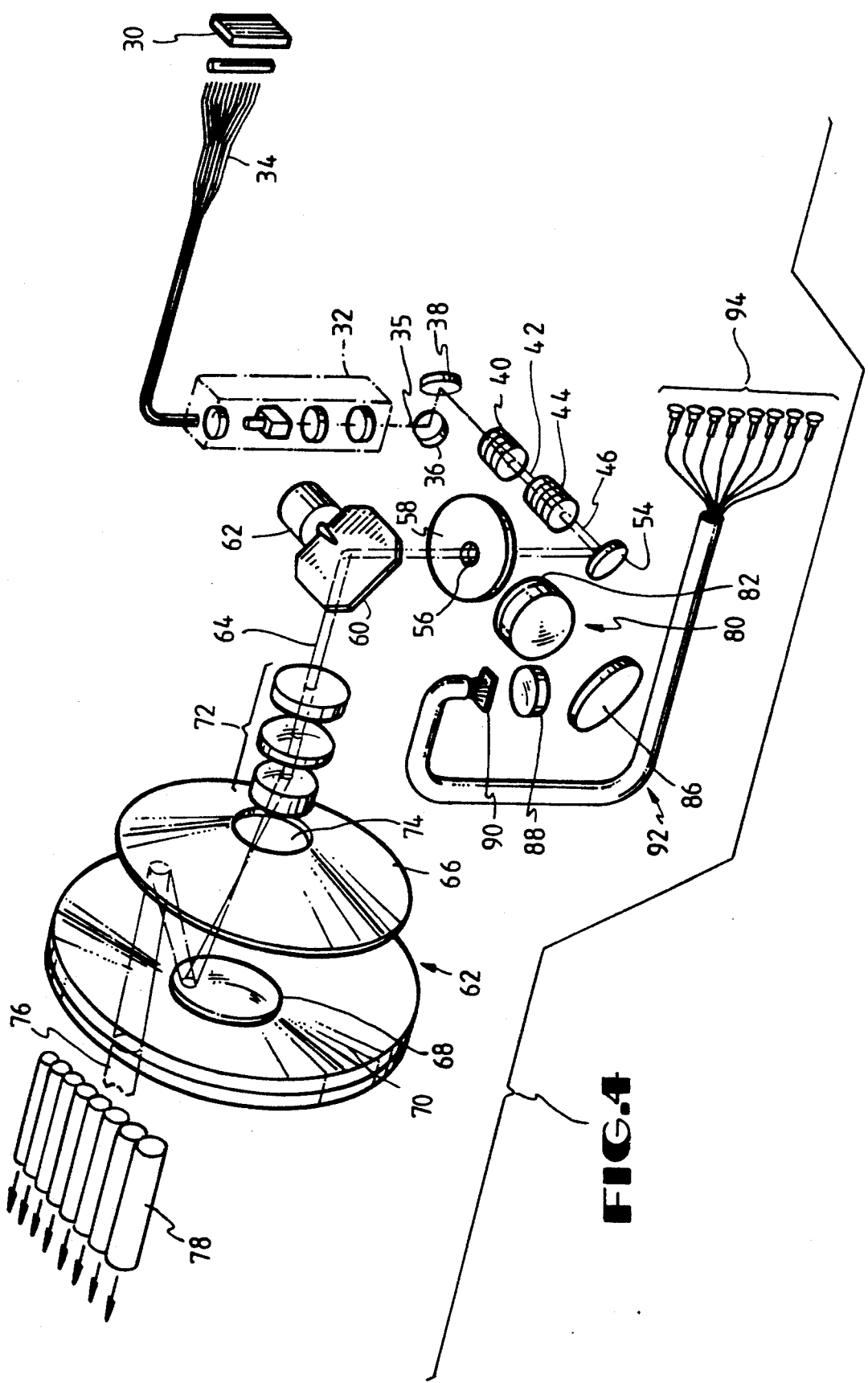
FIG. 4 is an exploded view of several components of the optical train of the apparatus of FIGS. 1-3.

FIG. 4 provides and exploded view of some of the optics of the seeker head 10. A gallium aluminum arsenide laser 30 pumps a solid state laser 32, which is mounted on the gimballed optical system 12 and which emits the laser light energy employed for illuminating the target. The GaAlAs pumping laser 30 produces a continuous signal of wavelengths suitable for pumping the solid state laser 32, e.g., in the crystal absorption bandwidth. Pumping laser 30 has an output power, suitably in the 10-20 watt range, sufficient to actuate the solid state laser 32. The pumping laser 30 is fixedly mounted on the housing 14, whereas the solid state laser 32 is mounted on the gimballed frame 16 for movement with the optical system 12. Output signals from the pumping laser are transmitted through an input lens and through a fiber optic bundle 34 which has sufficient flexibility to permit scanning movement of the seeker head during operation.

The solid state laser 32 is suitably a Neodymium doped yttrium aluminum garnet (YAG), a yttrium lithium fluoride (YLF), or Nd:YVO$_4$ laser operable to produce pulses with widths of 10 to 20 nanoseconds, peak power levels of approximately 10 kilowatts, at repetition rates of 10–120 kHz. The equivalent average power is in the range of 1 to 4 watts. The preferred range of wavelengths of the output radiation is in the near infrared range, e.g., 1.047 or 1.064 microns.

As seen most clearly in FIG. 4, the output beam 35 generated by solid state laser 32, in the present embodiment, is successively reflected from first and second turning mirrors 36 and 38 to beam expander 40. The beam expander 40 comprises a series of (negative and positive) lenses which are adapted to expand the diameter of the beam to provide an expanded beam 42, suitably by an 8:1 ratio, while decreasing the divergence of the beam.

The expanded beam 42 is next passed through a beam segmenter 44 for dividing the beam into a plurality of beam segments 46 arrayed on a common plane, initially overlapping, and diverging in a fan shaped array. The divergence of the segmented beams 46 is not so great as to produce separation of the beams within the optical system 12, but preferably is sufficiently great to provide a small degree of separation at the target, as the fan-shaped beam array is scanned back and forth over the target (as will be described below with reference to output beam segments 48).

Figure 5:
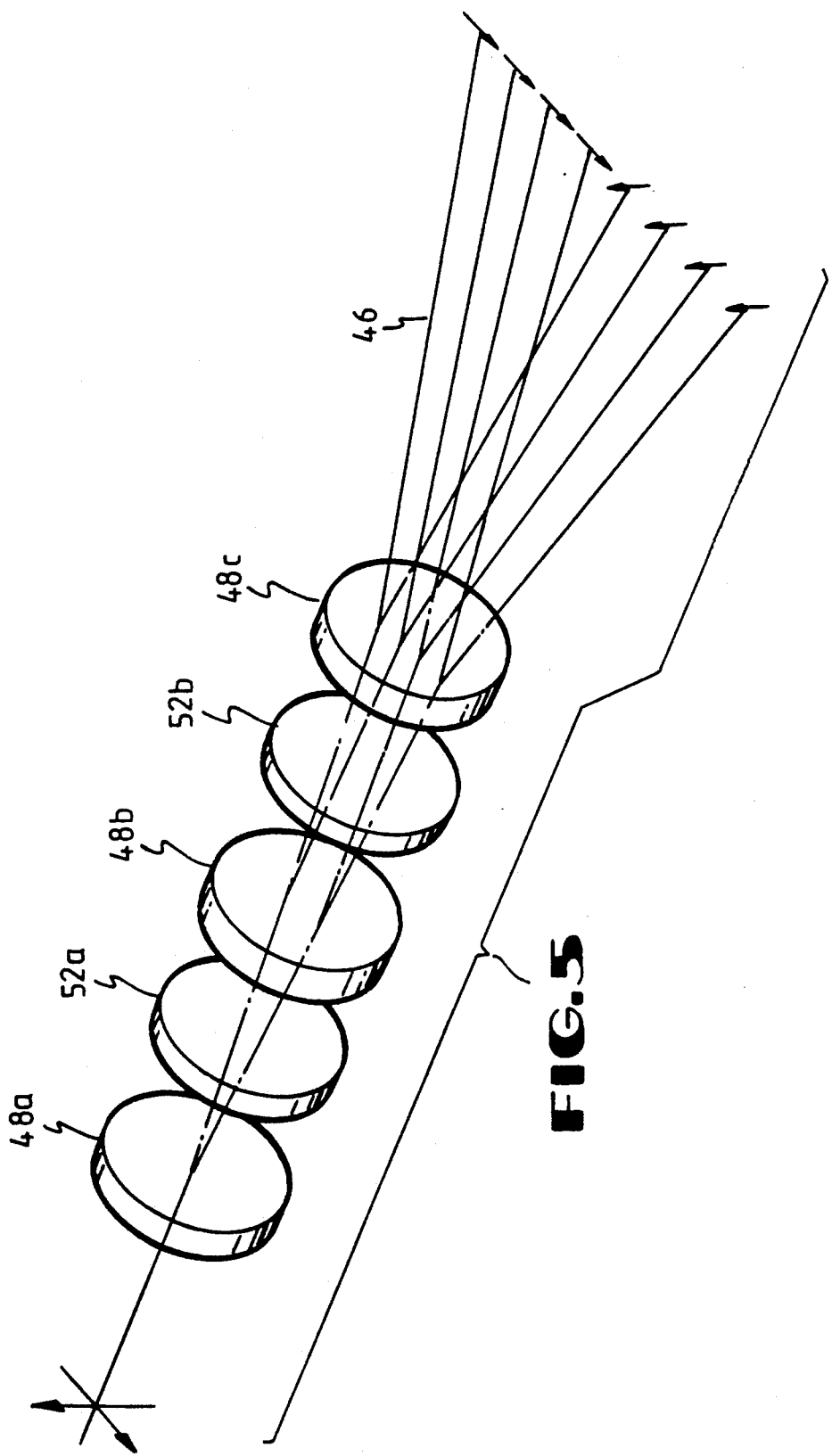
FIG. 5 is an exploded view of the beam segmenter of the apparatus of FIGS. 1-4.

FIG. 5 depicts the physical construction of the segmenter 44. Preferably, a plurality of calcite wedges 48$a$, 48$b$, and 48$c$ of approximately 5 to 7 mm. diameter is provided, the wedges being supported within a suitable housing 50 (FIG. 1) mounted on the preferred frame 16 and positioned in coaxial alignment with the expanded beam 42 emitted from the beam expander 40. The preferred embodiment employs three wedges, each operable as a bi-refringent crystal to divide a circularly polarized beam into two linearly polarized beams, one vertically polarized and one horizontally polarized as shown in FIG. 5, and travelling at slightly different angles. First and second ¼ wave retarders 52$a$ and 52$b$ are interposed between respective adjacent pairs of the calcite wedges 48 for changing the linearly polarized beams, produced by the wedges, back to circularly polarized beams before entering the next wedge, in order to split up each beam once again. Other beam segmentation methods are also possible provided they allow for overlapping beams, e.g. holographic diffraction gratings.

As shown in FIG. 4, the resultant segmented beams 46 are then reflected from a third turning mirror 54, passed through an aperture 56 of an apertured mirror 58, and subsequently reflected from a scanning mirror 60 in a forward direction relative to the missile. The aperture 56 must be located off the center of the aperture mirror 58. The scanning mirror 60 is pivotally driven by a scanning drive motor 62, which is operable to cyclically scan the beam segments 46 for scanning the target area. In a preferred embodiment, the beam segments 46 are preferably scanned at a rate of approximately 100 Hz. The turning axis of the scanning motor is aligned in parallel with the segmenter wedges whereby the resultant beam array is scanned perpendicularly to the plane in which the beams are aligned.

An afocal, Cassegrainian telescope 62 is provided for further expanding an emitted beam 64 and reducing its divergence. The telescope 62 includes a forwardly facing primary mirror 66 and a rearwardly facing secondary mirror 68. A protective outer dome 70, of a suitable transparent plastic or glass material such as BK-7 is mounted forwardly of the secondary mirror 68. A lens structure 72 is mounted in coaxial alignment between the primary mirror 66 and the scanning mirror 60, and an aperture 74 is formed centrally through the primary mirror in alignment with the lens structure. The transmitted beams which are reflected from the scanning mirror are directed through the lens structure 72 for beam shaping, subsequently directed through the aperture 74 formed centrally through the primary mirror, and subsequently reflected from the secondary mirror 68 spaced forwardly of the primary mirror and is then reflected from the front surface of the primary mirror 66. The resultant transmitted beam 76, is a fan shaped array which is scanned about an axis parallel to its plane. The beam array 78 illustrates the diverged spacing of the beam segments as they reach the target, wherein the beams are in side-by-side orientation, mutually spaced by a center-to-center distance of twice their diameters.

The telescope 62 receives laser energy reflected from a target that has been illuminated by the array of transmitted beams. This received energy is then reflected successively through the primary mirror 66 and the secondary mirror 68, the lens assembly 72, and the scanning mirror 60, toward the apertured mirror 58. Because the reflected beam is of substantially larger cross-sectional area than the transmitted beam, it is incident upon the entire reflecting surface of the apertured mirror 58, and substantially all of its energy is thus reflected laterally by the apertured mirror 58 toward collection optics 80. The collection optics 80 includes a narrow band filter 82, for filtering out wavelengths of light above and below a desired laser wavelength to reduce background interference from ambient light. The beam then passes through condensing optics 84 to focus the beam. The beam next strikes a fourth turning mirror 86 toward a focusing lens structure 88 adopted to focus the beam upon the receiving ends 90 of a light collection fiber optic bundle 92. The opposite ends of each optical fiber 92 are connected to illuminate a set of diodes 94 in a detector array, whereby the laser light signals are converted to electrical signals which are conducted to a processing and control circuit (not shown).

The fiber optic bundle 92 preferably includes nine fibers, eight of which are used for respectively receiving laser light corresponding to respective transmitted beam segments and one of which views scattered light from the transmitted pulse to provide a timing start pulse. Accordingly, the input ends 90 of the fibers 92 are mounted in linear alignment along an axis which is perpendicular to the optical axis. The respective voltage outputs of the detectors 94 thus correspond to the intensity of the laser radiation reflected from mutually parallel linear segments of the target area which is parallel to the direction of scan.

The detection system and circuitry are fixedly mounted relative to the housing or other suitable supporting structure aboard the missile, whereby the scanning and azimuth translations of the seeker head do not affect corresponding movement of the detection system. Accordingly, the mass of the components which are translated during scanning is substantially lower than would be the case if all components were gimbal-mounted.

FIG. 1 depicts the preferred structure of the components of FIG. 4. The flexible fiber optic cable 34 carries activating energy to the solid state laser 32. After striking the first turning mirror 36 and the second turning mirror 38 (not shown in FIG. 1), the emitted laser beam passes through a beam expander 40 and a beam segmenter 44. After striking the third turning mirror 54, the beam passes through the apertured mirror 58 and onto the scanning mirror 60 which is driven by the scanning motor 62. The lens structure 72 then directs the beam onto the secondary mirror 68 which reflects the beam onto the primary mirror 66. The beam, which is now a fan-shaped array but shown schematically in FIG. 1 as an arrow head, passes through the transparent outer dome 70 toward a target.

Energy reflected from a target is shown schematically in FIG. 1 as a donut shaped beam. It is shown this way because the secondary mirror 68 will block a minor portion of the return energy. The incoming beam follows the same path as the outgoing beam until the expanded beam strikes the apertured mirror 58. There, the beam is directed onto the fourth folding mirror 86 and from there to the receiving ends 90 of the fiber optic bundle 92.

While the present invention has been described in connection with a preferred embodiment, those of ordinary skill in the art will recognize many modifications to the present invention and this application is intended to cover any adaptations or variations of the invention.

We claim:

1. Apparatus for splitting reflected light from transmitted light, comprising:
   an optical system operable to transmit a first, diverging beam of light along a first axis and to receive a second, reflected beam coaxial with the first beam, the second beam having greater cross-sectional area than the first beam, said optical system including
   a splitter mirror lying in a plane at an angle to the first axial and having an off-center aperture coaxial with the first beam, the aperture being smaller in area than the second beam, and the mirror being sized to reflect a substantial portion of the second beam.

2. A laser scanning system, comprising:
   a. a laser light source operable to emit a laser beam along a first optical path;
   b. a turning mirror being positioned to redirect the laser beam along a second optical path;
   c. a mirror having an aperture therein, the aperture being off-center and located in the second optical path such that the redirected laser beam passes therethrough; and
   d. a scanning mirror being positioned in the second optical path to scan the redirected laser beam passing through said aperture along a third optical path.

3. A method of transmitting and receiving laser light comprising the steps of:
   a. generating a laser beam;
   b. passing the laser beam through an off-center aperture in a receiving mirror;
   c. scanning the laser beam in a scan pattern to reflect the beam off a target;
   d. receiving light of the laser beam reflected from the target; and
   e. reflecting the received light off the receiving mirror.

4. The system, as set forth in claim 2, wherein:
   the scanning mirror positioned to receive reflected light from the laser beam along the third optical path and redirect the reflected light along the second optical path toward the apertured mirror; and
   the apertured mirror is positioned to receive the reflected light along the second optical path and to redirect a substantial portion of the received reflected light along a fourth optical path.

5. The system, as set forth in claim 4, further comprising:
   e. collection optics being positioned to receive the substantial portion of the received reflected light along the fourth optical path.

6. The system, as set forth in claim 5, wherein the collection optics comprise:
   a filter being positioned to receive the substantial portion of the received reflected light and to deliver filtered light having a preselected wavelength;
   condensing optics being positioned to receive the filtered light and to deliver a focused beam of the filtered light;
   a fiber optic bundle having a first end and a second end, the first end of the fiber optic bundle being positioned to receive the focused beam; and
   a detector array being coupled to the second end of the fiber optic bundle, the detector array converting the focused beam into an electrical signal.

7. The method, as set forth in claim 3, further comprising the steps of:
   collecting the received light reflected off the receiving mirror; and
   converting the collected light into an electrical signal correlative to a position of the target.

8. The method, as set forth in claim 7, wherein said step of converting comprises:
   filtering the collected light;
   focusing the filtered light; and
   directing the focused light onto a fiber optic bundle, the fiber optic bundle being coupled to a detector array, the detector array converting the focused light into an electrical signal.

9. A laser scanning system comprising:
   a laser light source operable to emit a laser beam;
   a mirror having an aperture therein, the aperture being off-center with respect to said mirror and being positioned to pass said laser beam therethrough;
   a scanning device being positioned to receive said laser beam passing through said aperture, said scanning device redirecting said laser beam along a predetermined path; and
   an afocal Cassegrainian telescope being positioned to receive said redirected laser beam from said scanning device, said telescope transmitting said laser beam toward a target and receiving reflections of said transmitted laser beam from said target.

10. The system, as set forth in claim 9, wherein said telescope comprises:
    a primary mirror having a forwardly facing reflective surface and having a central aperture therein; and
    a secondary mirror having a rearwardly facing reflective surface, said primary mirror and said secondary mirror being positioned relative to one another with said forwardly facing reflective surface facing said rearwardly facing reflective surface.

11. The system, as set forth in claim 10, wherein said redirected laser beam from said scanning device passes through said aperture in said primary mirror, reflects off of said rearwardly facing reflective surface of said secondary mirror onto said forwardly facing reflective surface of said primary mirror, and reflects off of said forwardly facing reflective surface of said primary mirror toward said target.

12. The system, as set forth in claim 11, wherein said received reflections of said transmitted laser beam from said target reflect off of said forwardly facing reflective surface of said primary mirror onto said rearwardly facing reflective surface of said secondary mirror, and reflect off of said rearwardly facing reflective surface of said secondary mirror through said aperture in said primary mirror and onto said scanning device which transmits said received reflections to said mirror.

13. The system, as set forth in claim 9, further comprising:
   a beam segmenter being positioned between said laser light source and said mirror to receive said laser beam, said beam segmenter splitting said laser beam into a plurality of beams and delivering said plurality of beams to said scanning device by passing said beams through said aperture in said mirror.

14. The system, as set forth in claim 13, wherein said plurality of beams are arranged in a fan-shaped array.

* * * * *

UNITED STATES PATENT AND TRADEMARK OFFICE
CERTIFICATE OF CORRECTION

PATENT NO. : 5,200,606
DATED : April 6, 1993
INVENTOR(S) : Nicholas J. Krasutsky, et. al.

It is certified that error appears in the above-indentified patent and that said Letters Patent is hereby corrected as shown below:

Column 3, line 30, "preferred" should be --gimballed--.

Column 4, line 11, after "76" delete --,--.

Signed and Sealed this

Eleventh Day of January, 1994

*Attest:*

BRUCE LEHMAN

*Attesting Officer*  *Commissioner of Patents and Trademarks*